United States Patent
Jiang et al.

(10) Patent No.: US 7,826,198 B2
(45) Date of Patent: Nov. 2, 2010

(54) ELECTROCHEMICAL CAPACITOR WITH CARBON NANOTUBES

(75) Inventors: Kai-Li Jiang, Bei-Jing (CN); Shou-Shan Fan, Bei-Jing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 297 days.

(21) Appl. No.: 12/006,304

(22) Filed: Dec. 29, 2007

(65) Prior Publication Data
US 2009/0168302 A1 Jul. 2, 2009

(51) Int. Cl.
*H01G 9/00* (2006.01)
(52) U.S. Cl. .................................... 361/502; 361/503
(58) Field of Classification Search ............. 361/502
See application file for complete search history.

(56) References Cited

U.S. PATENT DOCUMENTS

| | | | |
|---|---|---|---|
| 4,725,926 A * | 2/1988 | Morimoto et al. ........... 361/502 |
| 6,790,425 B1 | 9/2004 | Smalley et al. |
| 7,056,455 B2 * | 6/2006 | Matyjaszewski et al. ... 264/29.2 |
| 7,553,341 B2 * | 6/2009 | Pan et al. .................... 29/25.03 |
| 7,553,351 B2 * | 6/2009 | Stebbing ...................... 75/577 |
| 2002/0008956 A1 | 1/2002 | Niu |
| 2002/0048143 A1 | 4/2002 | Lee et al. |
| 2002/0172639 A1 | 11/2002 | Horiuchi et al. |
| 2003/0185741 A1 | 10/2003 | Matyjaszewski et al. |
| 2004/0053780 A1 | 3/2004 | Jiang et al. |
| 2005/0002850 A1 | 1/2005 | Niu et al. |
| 2005/0081983 A1 | 4/2005 | Nakayama et al. |
| 2006/0098389 A1 | 5/2006 | Liu et al. |
| 2007/0041887 A1 | 2/2007 | Veedu et al. |

(Continued)

FOREIGN PATENT DOCUMENTS

CN 1317809 10/2001

(Continued)

OTHER PUBLICATIONS

Du et al., Carbon Nanotube thin films with ordered structures, Dec. 8, 2004, Journal of Materials Chemistry, 15, 548-550.*

(Continued)

*Primary Examiner*—Eric Thomas
*Assistant Examiner*—David M Sinclair
(74) *Attorney, Agent, or Firm*—Jeffrey T. Knapp

(57) ABSTRACT

An electrolytic capacitor includes a first electrode, a second electrode opposite to the first electrode, a separator sandwiched between the first electrode and the second electrode, a cell accommodating the first electrode, the second electrode and the separator, and an electrolytic solution filled into the inner space of the cell, with the first electrode, the second electrode and the separator immersed into the electrolytic solution. The first electrode and second electrode are in a CNT film structure, and the CNT film structure includes a number of CNT films stacked and packed closely by van der Waals attractive force. Each CNT film includes a number of aligned CNTs, and an angle between the aligned directions of CNTs of any two adjacent CNT film is in an approximate range from 0 to 90 degrees. The electrolytic capacitor is a high-performance capacitor.

18 Claims, 3 Drawing Sheets

U.S. PATENT DOCUMENTS

| | | | |
|---|---|---|---|
| 2007/0076349 A1 | 4/2007 | Dementiev et al. | |
| 2007/0148962 A1 | 6/2007 | Kauppinen et al. | |
| 2007/0166223 A1 | 7/2007 | Jiang et al. | |
| 2007/0237959 A1* | 10/2007 | Lemaire | 428/408 |
| 2008/0095694 A1* | 4/2008 | Nakayama et al. | 423/445 B |
| 2009/0272935 A1* | 11/2009 | Hata et al. | 252/70 |

FOREIGN PATENT DOCUMENTS

| | | | |
|---|---|---|---|
| CN | 1623210 | | 6/2005 |
| CN | 1770344 | | 5/2006 |
| JP | 02135719 A | * | 5/1990 |
| JP | 2005286008 | | 10/2005 |
| JP | 2007048907 | | 2/2007 |
| JP | 2007081384 | | 3/2007 |
| JP | 2007145634 | | 6/2007 |
| WO | WO0073204 A1 | * | 12/2000 |
| WO | WO2007047185 | | 4/2007 |
| WO | WO2007053155 | | 5/2007 |
| WO | WO 2007078005 A1 | * | 7/2007 |

OTHER PUBLICATIONS

Futaba et al., Shape-engineerable and highly densely packed single-walled carbon nanotubes and their application as super-capacitor electrodes, Nov. 26, 2006, Nature Materials, 5, 987-994.*

Frackowiak E et al, "Electrochemical storage of energy in carbon nanotubes and nanostructured carbons", Carbon, Elsevier,Oxford,GB, vol. 40, No. 10, Aug. 1, 2002, pp. 1775-1787.

* cited by examiner

ELECTROCHEMICAL CAPACITOR WITH CARBON NANOTUBES

RELATED APPLICATIONS

This application is related to commonly-assigned, co-pending application: U.S. patent application Ser. No. 12/006,317, entitled "ELECTROCHEMICAL CAPACITOR WITH CARBON NANOTUBES", filed on Dec. 29, 2007 and U.S. patent application Ser. No. 12/006,385, entitled "ELECTROCHEMICAL CAPACITOR WITH CARBON NANOTUBES", filed on Dec. 29, 2007.

BACKGROUND

1. Field of the Invention

The invention relates to capacitors, particularly, to a electrochemical capacitor with carbon nanotubes.

2. Discussion of Related Art

Conventionally, capacitors used in electric circuits includes electrolytic capacitor, ceramic capacitors, and like. Capacitors provide energy storage as other energy storage devices, such as batteries or fuel cells. Capacitors store energy in the electric field between two oppositely charged parallel plates, which are separated by an insulator. The amount of energy a capacitor can store increases as the area of conducting plate increases, the distance between the plates decreases, and the dielectric constant of the insulating material increases. The electrolytic capacitor stores energy by charge separation across a thin insulating oxide film that is often formed by a controlled electrolytic oxidation process at an appropriate metal. Generally, a volumetric capacitance density of electrolytic capacitor is improved by using porous electrodes to create a large effective plate area.

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). One of the characteristics of CNTs resides in that the aspect ratio of length to diameter is very large. In addition, the electric conductivity of carbon nanotubes is very high and allows a current flow at a current density of 100 MA/cm.sup.2 or more. Carbon nanotubes excel not only in electrical characteristics but also in mechanical characteristics. That is, the carbon nanotubes are distinctively tough, as attested by their Young's moduli exceeding 1 TPa, which belies their extreme lightness resulting from being formed solely of carbon atoms. Further, the carbon nanotubes have high elasticity, high resiliency and high chemical stability. These various and excellent characteristics tend to make CNTs ideal candidates for being used in field emission electronic devices, flat displays, as a hydrogen storage, and the like.

A new type of electrolytic capacitor using CNTs is disclosed. However, these CNTs are merely in contact with one another in a parent material. Therefore, it is difficult for the CNTs to provide stable electric conductivity and higher volumetric capacitance density.

What is needed, therefore, is a flexible electrolytic capacitor, which has stable and high electric conductivity, good charging/discharging property, and high volumetric capacitance density.

SUMMARY

An electrolytic capacitor includes a first electrode, a second electrode opposite to the first electrode, a separator sandwiched between the first electrode and the second electrode, a cell accommodating the first electrode, the second electrode and the separator, and an electrolytic solution filled into the inner space of the cell, with the first electrode, the second electrode and the separator immersed into the electrolytic solution. The first electrode and second electrode are in a CNT film structure, and the CNT film structure includes a number of CNT films stacked and packed closely by van der Waals attractive force. Each CNT film includes a number of aligned CNTs, and an angle between the aligned directions of CNTs of any two adjacent CNT film is in an approximate range from 0 to 90 degrees.

Compared with the conventional electrolytic capacitor, the present electrolytic capacitor has the following advantages: firstly, the CNT film structure has a high and stable electric conductive property, and the electrolytic capacitor has low internal resistance and good charging/discharging property. Secondly, the CNTs are uniformly dispersed in the CNT film structure, and thus the electrolytic capacitor has good reproducibility. Thirdly, the CNT film structure forms a porous structure, and then the interfacial surface area between the CNT film structure and the electrolytic solution is high, which results in a high energy density and volumetric capacitance density of the electrolytic capacitor. Fourthly, the CNT film structure is a thin and free-standing structure, and the electrolytic capacitor is flexible.

Other advantages and novel features of the present ion source element will become more apparent from the following detailed description of preferred embodiments when taken in conjunction with the accompanying drawings.

BRIEF DESCRIPTION OF THE DRAWINGS

Many aspects of the present electrolytic capacitor can be better understood with reference to the following drawings. The components in the drawings are not necessarily to scale, the emphasis instead being placed upon clearly illustrating the principles of the present f electrolytic capacitor.

Figure 1:
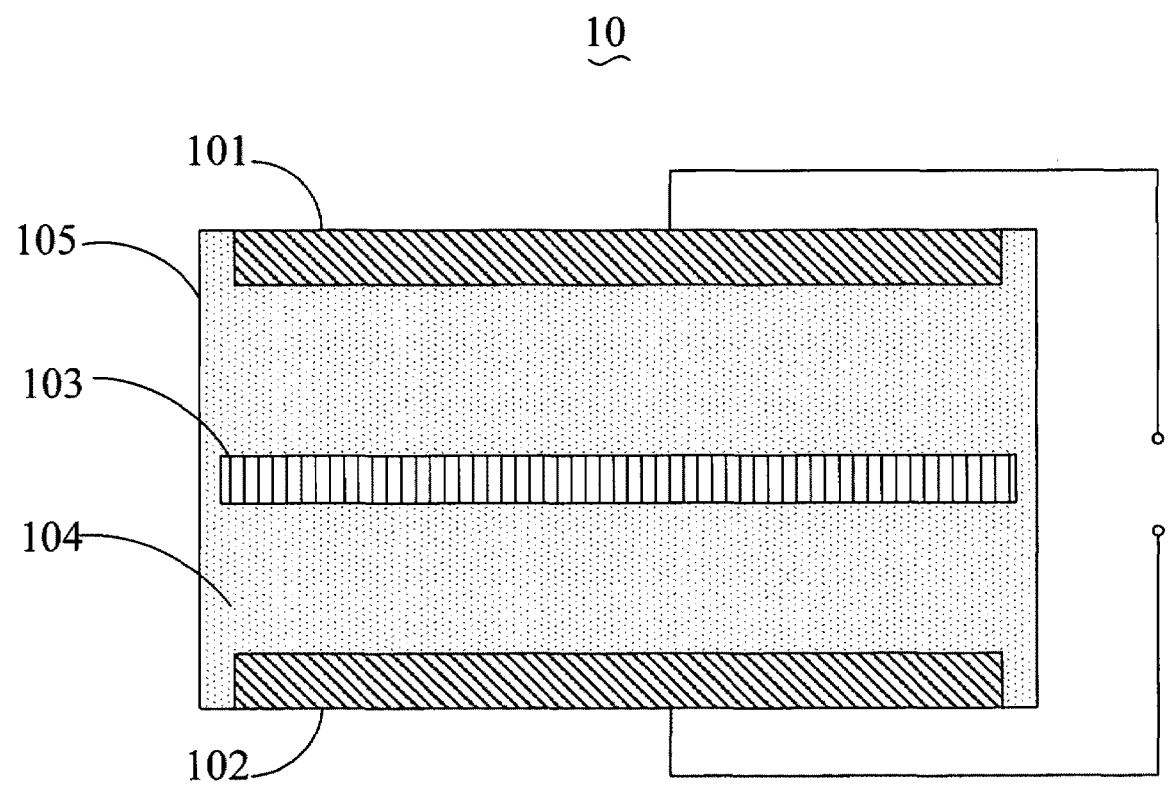
FIG. 1 is a schematic, cross-sectional view, showing the present electrolytic capacitor.

Corresponding reference characters indicate corresponding parts throughout the several views. The exemplifications set out herein illustrate at least one preferred embodiment of the present electrolytic capacitor, in one form, and such exemplifications are not to be construed as limiting the scope of the invention in any manner.

DETAILED DESCRIPTION OF PREFERRED EMBODIMENTS

Reference will now be made to the drawings to describe the preferred embodiments of the present electrolytic capacitor, in detail.

Referring to FIG. 1, an electrolytic capacitor 10 includes a first electrode 101, a second electrode 102 opposite to the first electrode 102, a separator 103 disposed between the first electrode 101 and the second electrode 102, an electrolytic solution 104 and a cell 105 accommodating all above elements therein.

The inner space of the cell 105 is filled with the electrolytic solution 104, and the first electrode 101, the second electrode 102 and the separator 103 are immersed into the electrolytic solution 104.

The separator 103 is an insulating porous material, composed of polymer material such as polyethylene, polypropylene, and polyolefin, or of nonwoven fiber material such as cellulose, polyester, and polypropylene. The separator 103 is configured for preventing electrical contact between the first electrode 101 and second electrode 102 and allowing the ions therethrough.

The electrolytic solution 104 can be anyone of known electrolytic solutions used in electrochemical capacitors, such as aqueous electrolytic solution or organic electrolytic solution.

The first electrode 101 and second electrode 102 are in a CNT film structure. The CNT film structure includes a number of CNT films stacked and packed closely by van der Waals attractive force. Each CNT film includes a number of aligned CNTs, i.e. substantially parallel to each other. An angle between the aligned directions of CNTs of any two adjacent CNT films is in an approximate range from 0 to 90 degrees (i.e., including 0 degree and 90 degrees).

A distribution of CNTs in the CNT film structure is uniform, and thus the electrolytic capacitor 10 has good reproducibility. Besides, due to the excellent electric conductivity of the CNTs, the crossed CNTs of the CNT film structure can form a conductive network. Thus, the CNT film structure has a high and stable electric conductive property, and the electrolytic capacitor 10 has low internal resistance and good charging/discharging property. In addition, the CNT film forms a porous/network structure with a pore size of less than 1 micron, and then the interfacial surface area between the CNT film structure and the electrolytic solution 104 is high, which results in a high energy density and volumetric capacitance density of the electrolytic capacitor 10. Further, since the CNT film is in a thin and free-standing structure, the first electrode 101 and second electrode 102 can be flexible, and then the electrolytic capacitor 10 can be formed like a thin and flexible film, which make the electrolytic capacitor 10 can be employable in IC cards, portable device, etc.

Figure 2:
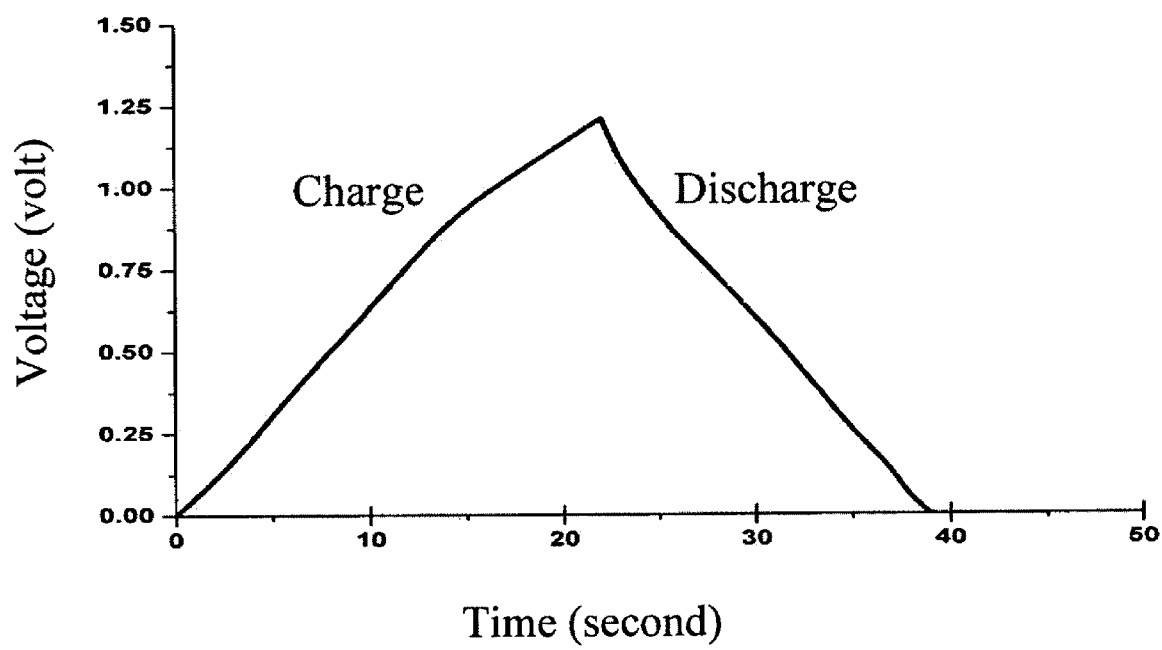
FIG. 2 is a charging/discharging graph of the present electrolytic capacitor.

Referring to FIG. 2, the charging/discharging graph of the present electrolytic capacitor shows a symmetrical structure under a current of 3 microamperes, and the present electrolytic capacitor has a good reproducibility. The volumetric capacitance density thereof is more than 100 farads per gram.

A length and width of the CNT film structure is not limited and can be determined according to practical needs. For preventing from the current leakage, a thickness of the CNT film structure is determined in a proper range. In the present embodiment, the thickness of the CNT film structure is in an approximate range from 1 micron to 1 millimeter.

The CNT film structure is formed by the following steps: (1) providing a CNT array; (2) drawing out a first CNT film from the CNT array; (3) adhering the first CNT film on a fixed frame, and removing the part of the first CNT film on an outside thereof; (4) repeating the step (2) and (3), then adhering a second CNT film above/upon the first CNT film adhered on the fixed frame; and (5) treating the above CNT films with an organic solvent.

In step (1), the super-aligned CNT is grown using a chemical vapor deposition method. The method is described in U.S. Pat. No. 7,045,108, which is incorporated herein by reference. Firstly, a substrate is provided, and the substrate is a substrate of p type silicon or n type silicon. Secondly, a catalyst layer is deposited on the substrate. The catalyst layer is made of a material selected from a group consisting of iron (Fe), cobalt (Co), nickel (Ni), and their alloys. Thirdly, the substrate with the catalyst layer is annealed at a temperature in an approximate range from 300 to 400 degrees centigrade under a protecting gas for about 10 hours. Fourthly, the substrate with the catalyst layer is heated to approximately 500 to 700 degrees centigrade and a mixed gas including a carbon containing gas and a protecting gas is introduced for about 5 to 30 minutes to grow a super-aligned CNT array. The carbon containing gas can be a hydrocarbon gas, such as acetylene or ethane. The protecting gas can be an inert gas. The grown CNTs are aligned parallel in columns and held together by van der Waals force interactions. The super-aligned CNT array can, opportunely, have a height above 100 μm and include a plurality of CNTs parallel to each other and approximately perpendicular to the substrate. In other word, a length of the CNTs is more than 100 μm.

The superficial density of the CNT array manufactured by above-described process with the CNTs being compactly bundled up together is higher. The van der Waals attractive force between adjacent CNTs is strong, and diameters of the CNT are correspondingly substantial.

In the step (2), the first CNT film may be drawn out from the CNT array with a tool with a certain width, such as an adhesive tape. Specifically, during the pulling process, as the initial CNT segments are drawn out, other CNT segments are also drawn out end to end, due to the van der Waals attractive force between ends of the adjacent segments. This process of drawing ensures a successive CNT film can be formed. The CNTs of the CNT film are all substantially parallel to the pulling direction, and the CNT film produced in such manner is able to formed to have a selectable, predetermined width.

The width of the first CNT film depends on the size of the CNT array. The length of the first CNT film is arbitrary. In one useful embodiment, when the size of the substrate is 4 inches, the width of the first CNT film is in the approximate range from 1 centimeter to 10 centimeters.

In the step (3), the fixed frame advantageously is quadrate and made of a metal or any other suitable structural material. The first CNT film has a favorable surface tension/good wetting and, thus, can firmly attach to the fixed frame. The part of the first CNT film extending out of the fixed frame can be removed by a mechanical force, such as scraping with a knife.

In the step (4), a second CNT film is drawn from the CNT array, as in the step (2). The second CNT film is adhered on the first CNT film and the fixed frame, as in the step (3). The first CNT film together with the second CNT film forms a stable two-layer film structure because of the van der Waals attractive force therebetween. A discernable inclination (i.e., an exact 0° angle is not intended) between the CNT of the first CNT film and that of the second CNT film is in an approximate range from 0° to 90°, quite usefully about 90° (e.g., at least within about ±5°).

Further, the step (4) can be repeated in order to get a multilayer CNT film structure.

Figure 3:
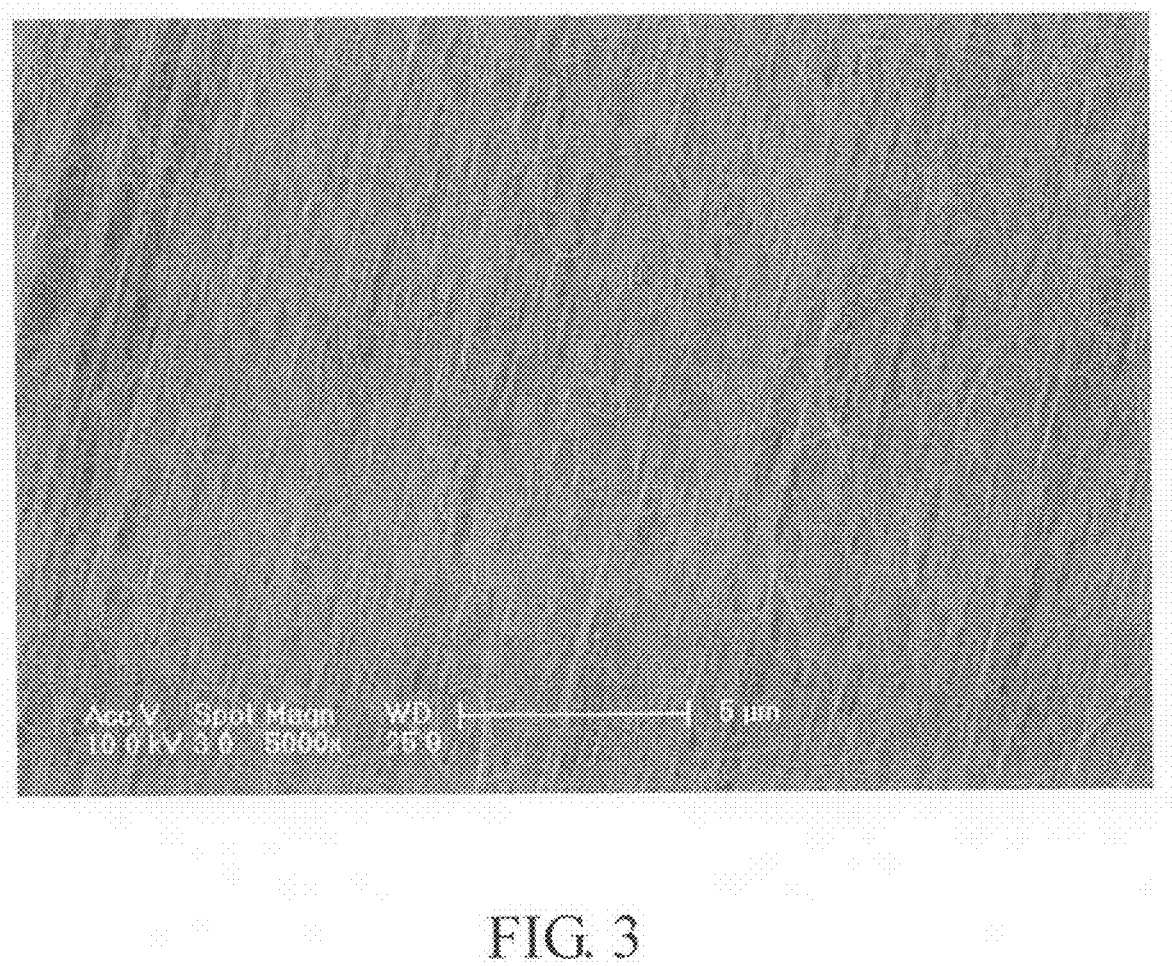
FIG. 3 is a Scanning Electron Microscope (SEM) photo, showing a CNT film structure.

In the step (5), the CNT film structure is treated with an organic solvent by dripping the organic solvent thereon or by soaking the fixed frame in a vessel filled with the organic solvent, as described in U.S. Pat. Pub. No. 2007/0166223. After this treatment, the CNT segment of the CNT film shrink into a number of the carbon nanotube yarns, and the CNT films are combined into a whole CNT film structure (shown in FIG. 3). The organic solvent is a volatilizable organic solvent, such as ethanol, methanol, acetone, dichloroethane, or chloroform.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An electrolytic capacitor comprising:
   a first electrode;
   a second electrode opposite to the first electrode;
   a separator sandwiched between the first electrode and the second electrode;
   a cell accommodating the first electrode, the second electrode and the separator;
   an electrolytic solution filled into an inner space of the cell, with the first electrode, the second electrode and the separator immersed into the electrolytic solution; and
   the first electrode and second electrode in a CNT film structure, the CNT film structure comprising a plurality of CNT films stacked and packed closely by van der Waals attractive force, each CNT film comprising a plurality of aligned CNTs, and the aligned directions of the CNTs of any two adjacent CNT films being different.

2. The electrolytic capacitor as claimed in claim 1, wherein the CNTs in the CNT film structure are uniform.

3. The electrolytic capacitor as claimed in claim 1, wherein the adjacent CNTs are in contact with and connect to each other by van der Waals attractive force.

4. The electrolytic capacitor as claimed in claim 1, wherein the separator is an insulating porous material.

5. The electrolytic capacitor as claimed in claim 4, wherein the separator is made of a material selected from the group consisting of polymer material and nonwoven fiber material.

6. The electrolytic capacitor as claimed in claim 5, wherein the polymer material is selected from the group consisting of polyethylene, polypropylene, and polyolefin.

7. The electrolytic capacitor as claimed in claim 5, wherein the nonwoven fiber material is selected from the group consisting of cellulose, polyester, and polypropylene.

8. The electrolytic capacitor as claimed in claim 1, wherein the electrolytic solution is aqueous electrolytic solution or organic electrolytic solution.

9. The electrolytic capacitor as claimed in claim 1, wherein the CNT film structure is in a porous structure.

10. The electrolytic capacitor as claimed in claim 9, wherein a pore size of the porous structure is less than 1 micrometer.

11. The electrolytic capacitor as claimed in claim 1, wherein the CNT film structure is a flexible and free-standing film.

12. The electrolytic capacitor as claimed in claim 1, wherein a thickness of the CNT film structure is in an approximate range from 1 micron to 1 millimeter.

13. The electrolytic capacitor as claimed in claim 1, wherein the CNTs of the CNT film structure have a height of about 100 micrometers.

14. The electrolytic capacitor as claimed in claim 1, wherein a volumetric capacitance density is more than 100 farads per gram.

15. The electrolytic capacitor as claimed in claim 1, wherein an angle between the aligned directions of CNTs of any two adjacent CNT film is greater than 0 degrees and less than 90 degrees.

16. An electrolytic capacitor comprising:
   a first electrode;
   a second electrode opposite to the first electrode;
   a separator sandwiched between the first electrode and the second electrode;
   a cell accommodating the first electrode, the second electrode and the separator;
   an electrolytic solution filled into an inner space of the cell, with the first electrode, the second electrode and the separator immersed into the electrolytic solution; and
   the first electrode and second electrode in a CNT film structure, the CNT film structure comprising a plurality of CNT films stacked and packed closely by van der Waals attractive force, each CNT film comprising a plurality of aligned CNTs, and an angle between the aligned directions of CNTs of any two adjacent CNT film being approximately 90 degrees.

17. The electrolytic capacitor as claimed in claim 16, wherein the first electrode is physically spaced from the separator.

18. An electrolytic capacitor comprising:
   a first electrode;
   a second electrode opposite to the first electrode;
   a separator sandwiched between the first electrode and the second electrode;
   a cell accommodating the first electrode, the second electrode and the separator;
   an electrolytic solution filled into an inner space of the cell, with the first electrode, the second electrode and the separator immersed into the electrolytic solution; and
   the first electrode and second electrode in a CNT film structure, the CNT film structure comprising a plurality of CNT films stacked and packed closely by van der Waals attractive force, each CNT film being formed of a plurality of CNT yarns connected end to end.

* * * * *